(No Model.)  2 Sheets—Sheet 1.
I. CORNELIUSSEN.
JOURNAL BEARING.
No. 525,338.  Patented Sept. 4, 1894.
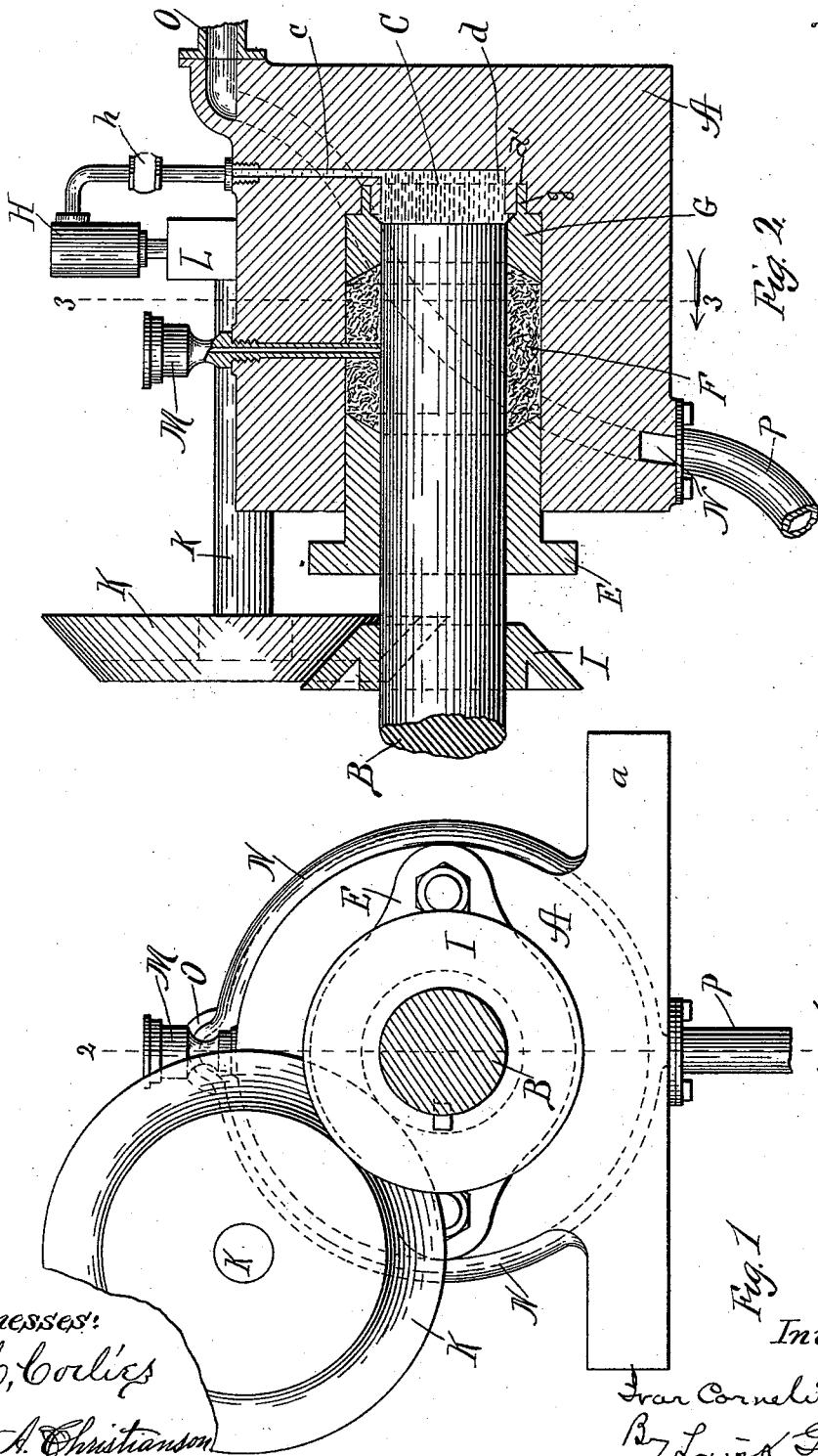
Witnesses:
W. C. Corliss
Jno. A. Christianson
Inventor:
Ivar Corneliussen
By Louis K. Gibson
Attorney (No Model.) 2 Sheets—Sheet 2.
I. CORNELIUSSEN.
JOURNAL BEARING.
No. 525,338. Patented Sept. 4, 1894.
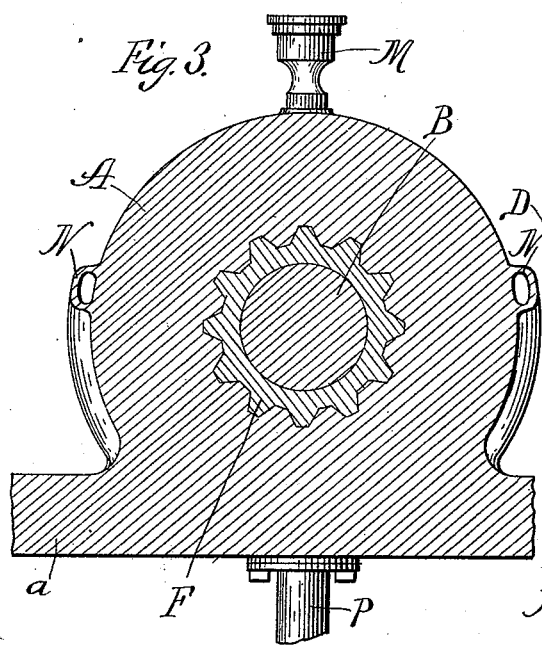
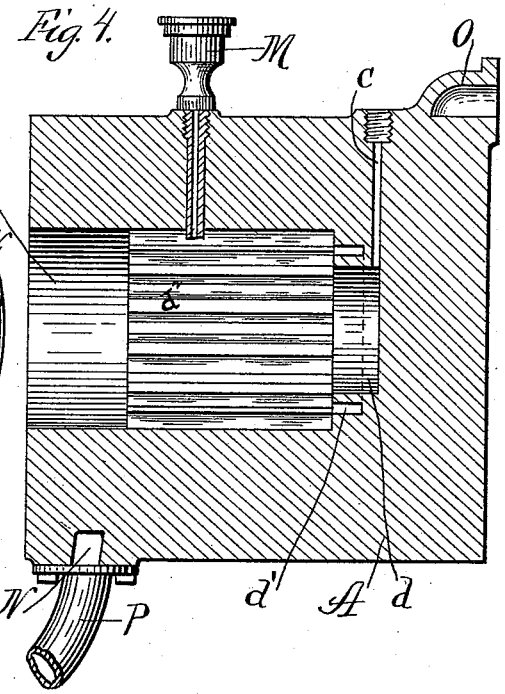
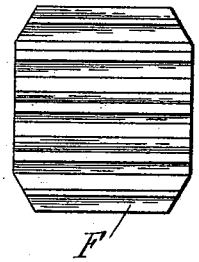
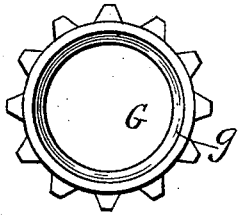
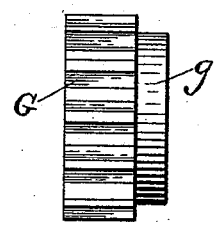
Witnesses:
W. C. Coelies
Jno. A. Christianson.
Inventor:
Ivar Corneliussen
By Louis K. Gillson
Attorney.

UNITED STATES PATENT OFFICE.

IVAR CORNELIUSSEN, OF CHICAGO, ILLINOIS.

JOURNAL-BEARING.

SPECIFICATION forming part of Letters Patent No. 525,338, dated September 4, 1894.

Application filed September 8, 1893. Serial No. 485,092. (No model.)

*To all whom it may concern:*

Be it known that I, IVAR CORNELIUSSEN, a subject of the King of Sweden and Norway, residing at Chicago, in the county of Cook and State of Illinois, have invented certain new and useful Improvements in Journal-Bearings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to journal bearings for shafts. Its object is to provide a practically frictionless bearing, for the end of the shaft, and it consists essentially of an oil cushion to serve as such bearing and of the various parts and arrangement of parts as hereinafter set forth for the purpose of providing and maintaining such cushion.

In the accompanying drawings, Figure 1, is an end elevation of the journal block, the shaft being shown in cross sections. Fig. 2, is a vertical, longitudinal section on the line 2—2 of Fig. 1. Fig. 3, is a transverse, vertical section on the line 3—3 of Fig. 2. Fig. 4, is a vertical, longitudinal section of the journal block on the line 2—2 of Fig. 1, the shaft packing and other mechanism being removed. Figs. 5, 6, and 7, are details of the packing.

Difficulty arises in the use of shafts, such as those carrying screw propellers, turbine water wheels, cranes, &c., in overcoming friction at the end of the shaft. I have surmounted this difficulty by forming at the inner end of the socket, in the journal block, a recess to be filled with oil, a practically noncompressible liquid, the end of the shaft resting against this oil, and the longitudinal pressure being communicated therethrough to the journal block. In accomplishing this purpose I use a journal block, A, which may be provided with any suitable means of attachment, for support, as shown at $a$, and which has a socket D, for, and of greater diameter than the shaft B. At the inner end of the socket D, is a circular recess, $d$, substantially of the same diameter as the shaft, to be filled with oil, C. Lateral bearings for the shaft are provided in packings, substantially in the form of a stuffing box, and comprising the gland E, adapted to be adjustably bolted to the block A; a metallic ring G, for encircling the end of the shaft, and an elastic packing, F, preferably of rubber, interposed between the gland and the ring, the surfaces of these metallic parts which bear upon the packing being inwardly beveled. An annular channel, $d'$, is cut in the block A, at the inner end of the socket and surrounding the recess $d$, and the ring G, is provided with an annular extension $g$, adapted to fit within the channel. The inner edge of the ring G, is beveled from the annular projection $g$, as plainly shown in Fig. 2, thereby exposing a limited surface to the pressure of the oil in such a manner as to force the ring G, against the packing F. The parts F, G, are prevented from rotating with the shaft by having their outer surfaces ribbed, the adjacent walls of the socket D, being correspondingly ribbed, as indicated at $d^2$.

The longitudinal pressure upon the ring G, communicated from the shaft through the oil, insures a tight fit of the packing F. In the event of wear of this packing the ring is moved outwardly, and, the oil chamber being thereby enlarged, the shaft moves inwardly. As the longitudinal movement of the shaft, must necessarily be very limited, means are provided for automatically increasing the supply of oil to fill the enlarged chamber, and maintain the shaft in its proper position. This is accomplished by extending a duct $c$ outwardly from the recess $d$, through the wall of the block A, and connecting with it the delivery pipe of an oil pump, of any desired construction, indicated but not shown in detail at H L. A beveled friction gear I, is keyed upon the shaft B, and adapted to co-operate with the beveled gear K, but normally out of frictional contact with it, though the surfaces of the two gears are in close proximity. A slight inward movement of the shaft B, brings the two gear wheels into contact and the pump is set in motion, the gear K, being connected with the pump by means of its shaft $k$. The check valve $h$, is placed in the delivery pipe of the pump. A few strokes of the pump will inject sufficient oil into the chamber $d$, to restore the shaft to its normal position, thereby disengaging the gear wheels I, K, and stopping the pump.

Lubrication of the shaft at its bearing upon the packing F, is provided for by an oil cup M, of ordinary construction. The journal bearing may be cooled by the flow of water through ducts N, spirally encircling the block A, and leading from the induction pipe O, to the discharge pipe P. In most situations this cooling device is unnecessary, but should be used with steamboat shafts and in that event the constant flow of water may be conveniently secured by opening the induction pipe O, to the sea, toward the bow of the vessel and the discharge pipe toward the stern.

The mechanism for replenishing the oil supply may be varied at pleasure to suit the situation in which the device is used. When this journal bearing is applied to a turbine it will be found unnecessary to use the oil cup M, and the cooling device, may, of course, be dispensed with and when applied to cranes or any other use where the motion is but slow, it will not be necessary to provide means for cooling the journal.

The surface area of the ring G, adapted to receive pressure from the oil C, may be varied in construction so as to secure the proper compression of the packing F. Any material amount of wear of the flexible packing may be taken up by turning up the bolts holding the gland E.

I claim—

1. In a journal bearing for the ends of shafts having longitudinal pressure, the combination with a block A, socketed to receive the shaft and packings, and having a recess $d$, at the bottom of its socket, of substantially the same diameter as the shaft, a quantity of oil for filling the recess $d$, and to serve as a cushion for the shaft end, a ring, G, encircling the end of the shaft, and having a portion of its end surface exposed to the oil, a pliable packing ring F, adjacent to the ring G, and an outer packing ring E, adjacent to the ring F, and means for securing the ring E, in position, substantially as described.

2. In a journal bearing for the end of shafts sustaining longitudinal pressure, the combination with a journal block, socketed for the reception of the shaft end and packings, and having a recess of substantially the diameter of the shaft, at the inner end of the shaft socket, and a duct leading from the recess to the exterior of the block, oil for filling the recess and to form a cushion for the shaft end, a pump for throwing oil into the recess through the duct, a drive gear wheel K, for the pump, a gear wheel I, keyed to the shaft and adapted to engage with the gear K, and actuate the pump when the shaft enters the block socket to an abnormal distance, substantially as described and for the purpose specified.

In testimony whereof I affix my signature in presence of two witnesses.

IVAR CORNELIUSSEN.

Witnesses:
L. K. GILLSON,
MILO B. GILLSON.